US008673030B2

(12) United States Patent
French et al.

(10) Patent No.: US 8,673,030 B2
(45) Date of Patent: Mar. 18, 2014

(54) METHODS OF PRODUCING WATER-RESISTANT SOLID FUELS

(75) Inventors: Robert R. French, Wellington, CO (US); Robert A. Reeves, Arvada, CO (US); Patrick B. Auell, Golden, CO (US)

(73) Assignee: GTL Energy Holdings Pty Limited (AU)

( * ) Notice: Subject to any disclaimer, the term of this patent is extended or adjusted under 35 U.S.C. 154(b) by 480 days.

(21) Appl. No.: 12/185,025

(22) Filed: Aug. 1, 2008

(65) Prior Publication Data

US 2009/0158645 A1   Jun. 25, 2009

Related U.S. Application Data

(60) Provisional application No. 60/953,253, filed on Aug. 1, 2007.

(51) Int. Cl.
*C10L 5/00* (2006.01)
*B30B 9/20* (2006.01)
*B30B 3/04* (2006.01)

(52) U.S. Cl.
USPC .......................................... 44/505; 100/176

(58) Field of Classification Search
USPC ......... 44/551, 620, 505; 241/3; 110/342, 218; 201/6; 100/176
See application file for complete search history.

(56) References Cited

U.S. PATENT DOCUMENTS

| | | | |
|---|---|---|---|
| 286,520 A | 10/1883 | Andrus | |
| 2,610,115 A | 9/1952 | Lykken | |
| 3,114,930 A | 12/1963 | Oldham et al. | |
| 3,506,200 A | 4/1970 | Raudenbush et al. | |
| 3,619,376 A * | 11/1971 | Patel et al. | 201/6 |
| 3,643,873 A | 2/1972 | George | |
| 3,822,827 A | 7/1974 | Clark | |
| 3,996,026 A | 12/1976 | Cole | |
| 4,047,898 A | 9/1977 | Cole et al. | |
| 4,057,399 A | 11/1977 | Cole et al. | |
| 4,104,035 A | 8/1978 | Cole et al. | |
| 4,166,802 A | 9/1979 | Slater et al. | |

(Continued)

FOREIGN PATENT DOCUMENTS

| | | |
|---|---|---|
| CA | 1145699 | 5/1983 |
| CA | 1213844 | 11/1986 |

(Continued)

OTHER PUBLICATIONS

U.S. Appl. No. 13/046,448, filed Mar. 11, 2011, French et al.

(Continued)

*Primary Examiner* — Prem C Singh
*Assistant Examiner* — Chantel Graham
(74) *Attorney, Agent, or Firm* — Sheridan Ross P.C.

(57) ABSTRACT

The invention provides a method by which high moisture low rank coal or other carbonaceous material may be transformed into a high-energy, water resistant product. The raw feed is comminuted then mechanically compacted by a roller press with rolls of a specified profile to mobilize the inherent moisture and collapse most of the interstitial pore space. The mobilized moisture is then removed by low-temperature drying and the material is sized and shaped to form a product that is resistant to re-absorption of water or other liquids. The present invention will promote the use of low rank coal for liquefaction and gasification.

17 Claims, 6 Drawing Sheets

(56) References Cited

U.S. PATENT DOCUMENTS

| | | | |
|---|---|---|---|
| 4,212,112 | A | 7/1980 | LaDelfa et al. |
| 4,223,449 | A | 9/1980 | Bodle et al. |
| 4,224,039 | A * | 9/1980 | Smith et al. ............... 44/551 |
| 4,225,391 | A * | 9/1980 | Perch et al. ............... 201/6 |
| 4,304,572 | A | 12/1981 | Wiese et al. |
| 4,309,109 | A | 1/1982 | Blodgett et al. |
| 4,309,190 | A | 1/1982 | Baron et al. |
| 4,372,749 | A | 2/1983 | Nielsen |
| 4,508,539 | A | 4/1985 | Nakai |
| 4,533,460 | A | 8/1985 | Ho |
| 4,726,531 | A | 2/1988 | Strasser |
| 4,782,747 | A | 11/1988 | Unger et al. |
| 5,005,770 | A | 4/1991 | Suessegger |
| 5,067,968 | A | 11/1991 | Davidson et al. |
| 5,125,931 | A | 6/1992 | Schulz |
| 5,251,824 | A | 10/1993 | Adelmann |
| 5,361,513 | A | 11/1994 | Woessner |
| 5,462,425 | A | 10/1995 | Kuss et al. |
| 5,509,612 | A | 4/1996 | Gerteis |
| 5,658,357 | A | 8/1997 | Liu et al. |
| 5,667,642 | A | 9/1997 | Luthi |
| 5,725,613 | A | 3/1998 | Reeves et al. |
| 5,752,993 | A | 5/1998 | Eatough et al. |
| 5,862,746 | A | 1/1999 | Bielfeldt |
| 5,876,648 | A | 3/1999 | Strasser et al. |
| 5,902,456 | A | 5/1999 | Sundqvist et al. |
| 6,054,074 | A | 4/2000 | Wu et al. |
| 6,148,599 | A | 11/2000 | McIntosh et al. |
| 6,311,849 | B1 | 11/2001 | Sbaschnigg et al. |
| 6,338,305 | B1 * | 1/2002 | McHenry et al. ............ 110/342 |
| 6,461,505 | B1 | 10/2002 | Danielsson et al. |
| 6,889,923 | B2 | 5/2005 | Gutierrez et al. |
| 7,128,767 | B2 | 10/2006 | French et al. |
| 2005/0039386 | A1 * | 2/2005 | French et al. ............... 44/620 |
| 2006/0112617 | A1 | 6/2006 | Clark et al. |
| 2006/0180525 | A1 | 8/2006 | Watters et al. |
| 2007/0023549 | A1 * | 2/2007 | French et al. ............... 241/3 |
| 2008/0222947 | A1 | 9/2008 | French et al. |

FOREIGN PATENT DOCUMENTS

| | | |
|---|---|---|
| CA | 2072245 | 12/1993 |
| CA | 2514525 | 8/2004 |
| CA | 2564543 | 11/2005 |
| DE | 216952 | 1/1985 |
| GB | 20679 | 1/1916 |
| GB | 05019 | 3/1916 |
| JP | 59-102989 | 6/1984 |
| JP | 06-172764 | 6/1994 |
| WO | WO 2004/072212 | 8/2004 |
| WO | WO2005028977 | 3/2005 |
| WO | WO 2006/119044 | 11/2006 |

OTHER PUBLICATIONS

International Preliminary Report on Patentability for International (PCT) Patent Application No. PCT/US08/72024, mailed Feb. 11, 2010.

International Search Report for International (PCT) Patent Application No. PCT/US08/72024, mailed Oct. 22, 2008.

Written Opinion for International (PCT) Patent Application No. PCT/US08/72024, mailed Oct. 22, 2008.

Examiner's First Report for Australian Patent Application No. 2008-255240, mailed Jan. 19, 2010.

Official Action for Canadian Patent Application No. 2,690,906, dated Jul. 12, 2011.

Examination Report for New Zealand Patent Application No. 594100, dated Jul. 19, 2011.

Anagnostopoulos, "Compressibility Behaviour of Soft Lignite," Journal of Geotechnical Engineering Division, Dec. 1982, vol. 108, No. 12, pp. 1549-1566.

Brockway, "Mechanical Thermal Expression of High Moisture Lignite," 18th International Low Rank Fuels Symposium, Billings, Montana, Jun. 2003, 8 pages.

Bullinger, "Lignite Fuel Enhancement," 18th International Low-Rank Fuels Symposium, Billings, Montana, Jun. 2003, 12 pages.

Cengiz Akdeniz et al., "Cotton Stalk as a Potential Energy Source," Energy Sources, Part A: Recovery, Utilization, and Environmental Effects, 2004, vol. 26(1), pp. 65-75.

Couch, "Lignite Upgrading," International Energy Agency Coal Research, London, UK, May 1990, pp. 1-72.

Durie, "Science of Victorian Brown Coal: Structure, Properties, and Consequences for Utilization," CSIRO, Division Coal and Energy Technology, 1991, 737 pages, Melbourne, Australia.

Mani et al., "Economics of Producing Fuel Pellets from Biomass," Applied Engineering in Agriculture, 2006, vol. 22(3), pp. 421-426.

Notice of Acceptance for Australian Patent Application No. 2008255240, dated Mar. 31, 2011.

Examination Report for New Zealand Patent Application No. 572827, dated May 25, 2011.

Extended European Search Report for European Patent Application No. 08797070.3, dated Sep. 7, 2011.

Official Action for European Patent Application No. 08797070.3, dated Sep. 26, 2011.

Official Action for Australia Patent Application No. 2011202676, dated Dec. 12, 2011.

Official Action for Canadian Patent Application No. 2,690,906, dated Jun. 6, 2012, 2 pages.

Official Action for European Patent Application No. 08797070.3, dated May 10, 2012, 2 pages.

* cited by examiner

METHODS OF PRODUCING WATER-RESISTANT SOLID FUELS

CROSS REFERENCE TO RELATED APPLICATION

This application claims the benefit of priority under 35 U.S.C. §119(e) to U.S. Provisional Patent Application Ser. No. 60/953,253 filed Aug. 1, 2007, which is incorporated herein by reference.

TECHNICAL FIELD

The invention describes methods of producing high-energy content solid fuels from low-rank coals. The solid fuel products are resistant to water absorption and are ideal feedstock for slurry-fed gasification and liquefaction systems.

BACKGROUND OF INVENTION

Low rank coals (LRCs) compose nearly 50% of the total coal produced in the United States and about one-third of the coal produced worldwide. A significant proportion of LRCs contain high levels of moisture that can prohibit utilization as feedstock for gasification and liquefaction, and other uses. A LRC with high-moisture content is not generally suitable for gasification because of low efficiency and poor yield of synthesis gas (a mixture of carbon monoxide and hydrogen). The high concentration of moisture is deleterious because of the extra energy required to evaporate moisture and its effect on the molar ratio of hydrogen and oxygen required for efficient production of synthesis gas or the subsequent production of naphtha and diesel fuel by the Fischer-Tropsch process. The production of synthetic natural gas and liquefaction products is also negatively impacted by excess moisture.

Some gasifiers accept solid feedstock, and others accept slurry feed. The slurry-feed type gasifiers have been used for many years and are well suited to gasify coal provided that the slurry contains a specified minimum energy content, typically 16,282 kJ/kg (7,000 Btu/lb). Currently, slurry-fed gasifiers use fuel feedstocks with a low inherent moisture such as high-grade coals or coke. These fuel feedstocks produce slurries with a sufficiently high thermal energy content to meet the economic requirements of gasification.

Availability of high-grade coal and excessive transportation cost has, to date, excluded large areas of the western United States from consideration as viable locations for gasification. LRC's in these regions are abundant, but have too much inherent moisture to make high-energy content slurry.

In low rank coals, water is present in two forms: inherent moisture, a form that is contained wholly within the particle, and surface moisture, present on the exterior of the particle as a liquid. The water contained in the particle does not contribute to forming slurry, but only serves to dilute the energy content contained in the coal. Water that is exterior to the particle provides the vehicle to form a slurry. Sufficient water, typically 30 wt %, is required to provide a slurry mixture that has the desired rheological properties to be stored, mixed, pumped, and fed into the gasifier. The sum of inherent water and exterior water present in LRCs dilute the energy provided by the coal solids to a degree that it is not acceptable as an economic feed to the gasifier.

Researchers have attempted to reduce inherent moisture in an attempt to form a high-energy slurry. Various methods have been proposed to treat the raw LRC prior to slurry production. They include thermal drying with direct contact of high-temperature gas, indirect drying with contact of the coal with high temperature surfaces, and hydrothermal treatment where coal is immersed in a water-filled vessel held at high temperature and pressure. These methods have proved unsatisfactory due to excessive cost or production of a product that will re-absorb moisture when immersed in liquid water during the slurry production process.

Researchers also have attempted to identify agents that can be applied to the dried material to render the product incapable of reabsorbing moisture when immersed in water. Water-repellent chemicals such as waxes and petroleum-based materials have been used. Unfortunately, the cost of chemical treatment has largely precluded the use of these chemicals.

Thus, there remains a need for effective and cost-efficient processes to prepare low rank coals for use in gasification and liquefaction.

SUMMARY OF INVENTION

The present invention provides mechanical means to efficiently treat Low Rank Coals (LRCs) to reduce inherent moisture and prevent re-absorption of water when immersed. These processes mechanically and efficiently transform the raw LRC under high pressure to collapse the porous structure, thereby expressing moisture contained in the pores, and collapsing the pores to prevent liquid water from reentering, resulting in a solid fuel product that this ideally suited for use in gasification and liquefaction processes.

The inventive processes prepare raw solid fuel for use as feedstock by a process that continuously exerts high compaction forces at ambient temperature to the feed material. Some solid fuels are of poor quality and require pre-treatment to improve heat content or reduce deleterious substances. In these cases, the feed may be initially treated with chemicals or prepared by gravity separation or sizing operations.

Force is used to collapse the material's porous structure, expelling water to the surface of the compacted material. The wet compacted material is then fed to a low-temperature or ambient-temperature drying device where a substantial proportion of the water is evaporated from the surface of the material. Operating the present invention at low temperatures minimizes oxidation of the material and the opening of pores in the product as steam is expelled.

In these processes, the material is dried to the desired moisture content, and then re-compacted under high mechanical pressure to further reduce pore volume and make the compacted material less likely to reabsorb liquid water. Some LRC's contain excessive amounts of ash. Therefore, one aspect of the inventive processes include a pretreatment of the LRC feedstock with an acid or by desliming to remove deleterious or inert constituents.

A slurry of the LRC that has been treated with mechanical forces of the inventive processes may be formed in two ways depending. In the first instance, the dried material is formed into pellets or ovoid-shaped particles, such as briquettes. These formed materials are mixed with water or other liquid and pumped to the point of use. Commonly known commercial slurry preparation methods may be employed to mix water or liquid with solid materials produced by the processes of the present invention. In the second instance, where finely sized materials are required, the dried material may be re-compacted and crushed to form granular material with a specified size distribution.

The present invention provides a novel method to treat lignite, subbituminous coal, and solid carbonaceous materials used to feed coal gasifiers. A significant proportion of the water contained in pores of LRC (often as much as 40% or more of the total water) can be efficiently mobilized under high pressure with mechanical means. The mobilized water, which would otherwise dilute the energy contained in the organic material comprising the LRC, is removed by low-temperature drying methods or other means. The high pressure provides the benefit of collapsing the pores to prevent liquids from re-entering the particle when it is immersed during slurry processing. Additional compaction steps can be used to further seal the material from water re-absorption.

DESCRIPTION OF EMBODIMENTS

Figure 1:
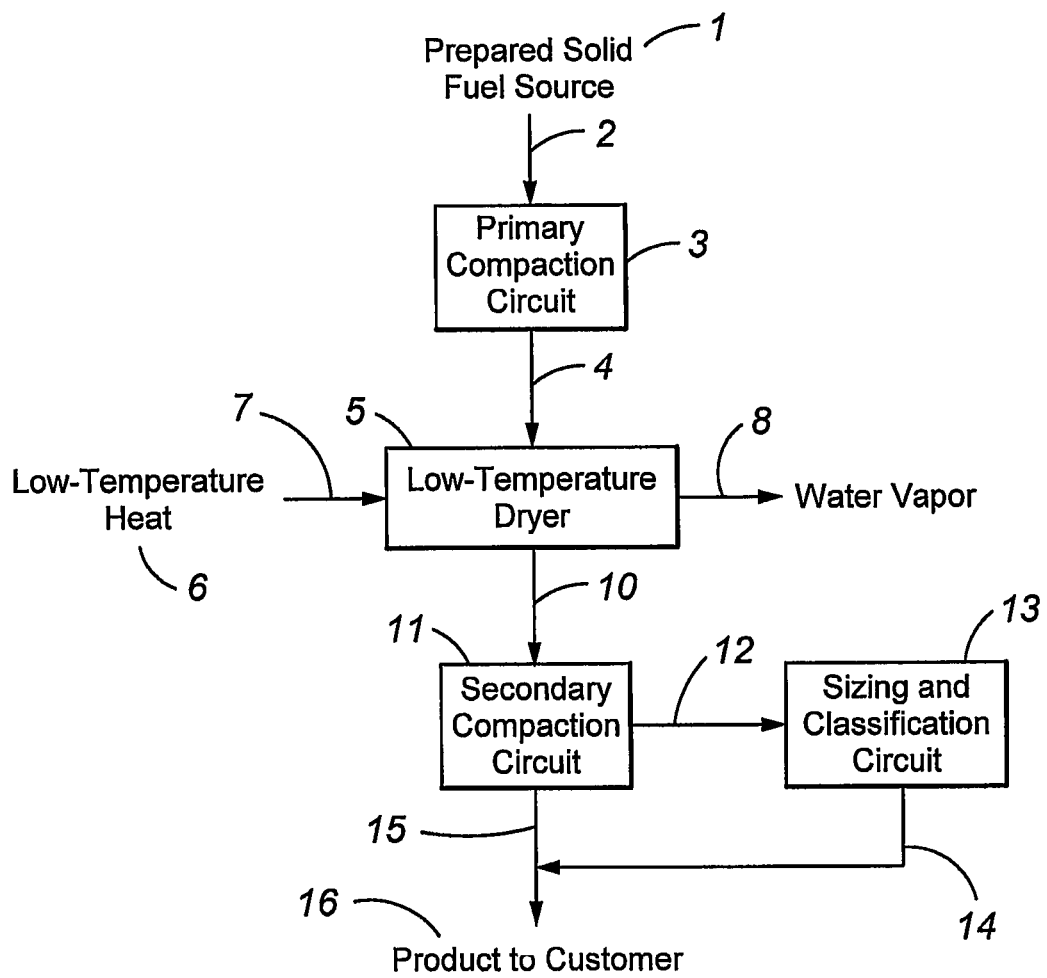
FIG. 1 shows a schematic drawing of the preparation process to form high-energy, water-resistant solid fuels from LRCs.

The present invention provides processes that beneficiate a solid fuel to produce a higher-energy fuel useful for the production of energy in conventional energy extraction or fuel production processes. One aspect of the invention provides treatment procedures that include three subsystems: 1) raw solid fuel preparation; 2) material compaction; and, 3) drying the compacted material.

Raw Solid Fuel Preparation

The raw solid fuel preparation begins with the receipt of a solid fuel material of traditional trade top size, typically about 50 mm. A comminution device is used to reduce the particle size distribution of the solid fuel into a range of finer particle top size. A hammer mill, roll crusher, or any other appropriate comminution device may be used. The optimum top size required to provide the desired compaction properties is experimentally determined for a particular solid fuel feedstock and the intended application of the compacted and dried product. The particle top size will typically vary between about 0.5 mm and about 6 mm in the longest diameter of the particle.

In one embodiment, the crushed material may be further treated after comminution to remove clays and metallic ions that can interfere with the compaction process. In a preferred embodiment, the crushed material is treated with an acid, such as sulfuric acid, and deslimed.

Material Compaction

Solid fuel that has been comminuted to the desired particle top size is continuously compacted with sufficient force to collapse the porous structure of the fuel, thereby mobilizing waters held in fractures, voids, and pores from the interior of the solid particles to the surface of the solid particles. The compaction can be performed at any temperature, but is preferably preformed at ambient temperature to avoid adding unnecessary energy or infrastructure costs to the processing. The comminuted solid fuel is subjected to a compaction pressure of at least 20,000 kPa. Preferably, the comminuted solid fuel is subjected to a compaction pressure greater than, or equal to, 100,000 kPa. Preferably, the compaction pressure is no greater than 300,000 kPa. More preferably, the compaction pressure is no greater than 270,000 kPa.

Any compaction machinery capable of continuous processing at these compaction pressures may be used for the compaction during the solid fuel processing. Preferably, a roller press is used to compact the feed material. In one embodiment, preferred roller press rolls for use in compaction processes of the present invention have a specific design that delivers higher capacity and lower energy consumption than smooth rolls of conventional roller press roll design. Preferred roll designs for use in the compaction processes of the invention are described in detail below. Using the preferred roll press machinery incorporating the roll press rolls described below, the energy requirement of the compaction step is greatly reduced over the energy required to effect the same or similar compaction using smooth rolls in a conventional roll press. The energy savings can be a great as 50%. In the roll press machinery, a screw pre-compacts the crushed material into the rolls of the roll press, thereby guiding crushed feed into the rolls for compaction. The energy utilized to drive the screw of the roll press associated with the rolls of a roll press of the present invention is significantly reduced compared to the energy utilized to drive the screw of a conventional roll press using the same feed material. This reduced energy utilization for driving the screw of the roll press results in great energy savings in operating a roll press utilizing rolls in the design of the present invention. This energy savings will overcome the increased energy that may be required to drive the rolls of the roll press of the present invention, as compared to the energy required to drive the rolls of a conventional roll press.

Drying

The compacted product, usually in flake or pellet form, is transferred to a vessel where feed particles can be efficiently dried to remove water expelled from the interior surfaces of the particles during the compaction processes that may be residing on the external surfaces of the compacted particles. The dried product will have a higher heating value than the raw feed material. Any effective means may be used to dry the compacted particles, but the use of expensive or energy intensive means is almost always prohibitive of a cost-effective process. Therefore, in a preferred embodiment, the compacted material is dried by contact with low humidity air to evaporate the surface moisture present on the compacted material using a low-temperature drying device. The low humidity air is preferably warmed to above ambient temperatures to facilitate the evaporation. The temperature of the compacted material during the drying is preferably maintained in the range of about 40° C. to about 60° C. Air is preferably directed over the drying material at an air speed in the range of 14.2 $m^3$/min to about 28.3 $m^3$/min (about 500 CFM to about 1000 CFM), per short ton of water evaporated.

The drying vessel is not limited by type or style as long as it is compatible with the process material and maintains a relatively low material temperature, less than about 100° C. In a preferred embodiment, the drying vessel is an indirect-fired rotary dryer. The compacted material is dried to a moisture level (expressed as the total moisture as weight percentage of the total weight of the material) of less than about 25%. Preferably, the moisture level of the dried material is less than about 20%, or more preferably less than about 18%, or more preferably less than about 16%, or more preferably less than about 14%, or more preferably less than about 10%, or more preferably less than about 7%.

FIG. 1 shows a schematic drawing of a preparation process of the present invention to form high-energy, water-resistant solid fuels. A source of prepared solid fuel (1) supplies treated feed (2) to the primary compaction circuit (3) where it is compressed under high mechanical pressure to force water from its internal pores to produce a flake product with water adhering to the surface of the compacted material (4). The compacted material is fed to a dryer (5) that uses a source of low-temperature heat (6) such as waste heat from a gasification plant or fossil-fired power plant to heat air (7) and the dryer heat exchange surfaces. The heat evaporates water (8) to form a vapor (9) that passes to the atmosphere or other processes that may condense the vapor for a useful purpose. Dryer product (10) contains substantially less moisture and pore volume than the feed. This material may be directed to a secondary compaction circuit (11) that further reduces the pore volume to form a final product that resists absorbing water or other liquid. The secondary compaction may be conducted with a roll press similar to the preferred roll press of the present invention or with additional compaction machinery such as any of the conventional briquetting machinery or custom compaction machinery designed to impart a specific shape to the dried material. The compacted product may be sent (12) to a comminution and classification circuit (13) to produce granular material (14) of a specified particle size distribution, or sent as a formed material such as ovoids or other shapes (15) to the end user (16).

Figure 2:
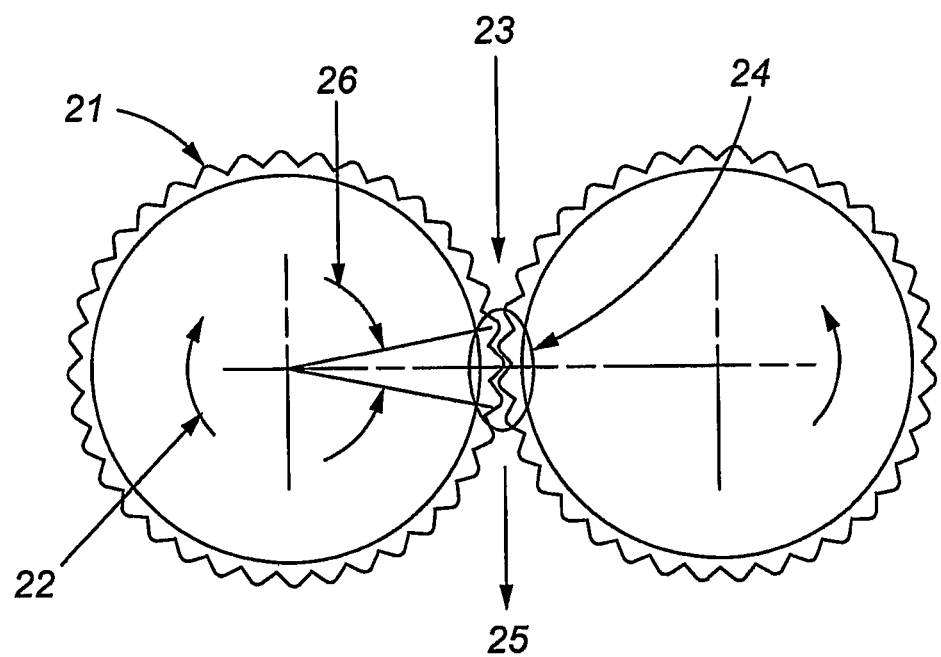
FIG. 2 shows two identical counter-rotating rolls timed peak-to-valley to provide effective compaction, high production rates and low specific energy consumption.

In a preferred embodiment, the primary compaction is applied to the LRC feed by compressing the material between two counter-rotating rolls of a roll press. Common rolls with smooth or corrugated profiles, by their design, do not maintain feed material within the compaction zone for a sufficient time to effectively mobilize water from pores to the surface of the compacted particles. More effective compaction occurs if the feed material can reside in the compaction zone for an extended period. The compaction rolls of the present invention provide longer compaction time because their profile exerts high compaction forces over a wide arc of rotation. FIG. 2 shows two identical counter-rotating rolls of the present invention, each having an undulating peripheral surface that rotate in a timed, peak-to-valley process to provide highly-effective compaction, high production rates and low specific energy consumption.

Referring to FIG. 2, two compaction rolls (21) rotate (22) to compress feed material (23) in the compaction zone (24) to produce a compacted product (25). Effective compaction occurs as the material resides for a relatively long time as the undulating surface of the rolls rotate through the rotation arc (26) in a manner timed to interlock peak-to-valley.

Figure 3:
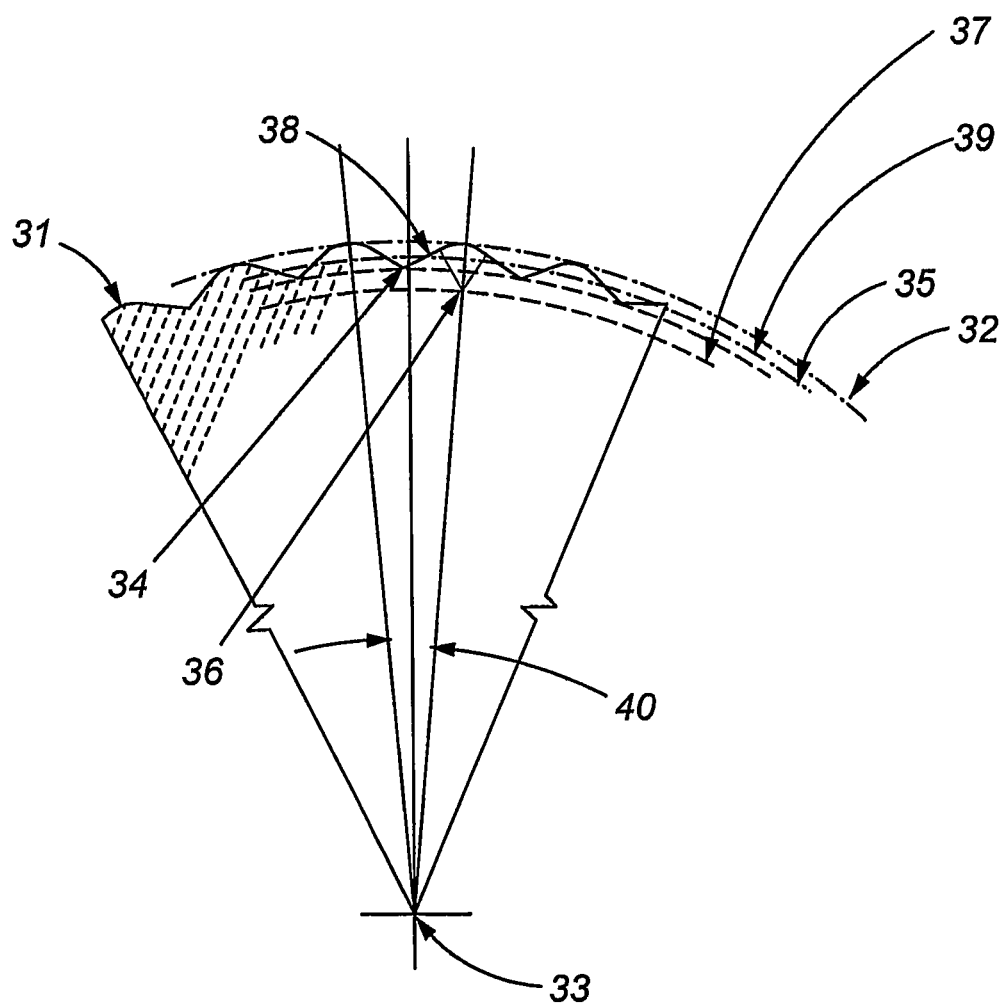
FIG. 3 shows a detailed view of a roll profile that enables the feed material to reside in the compaction zone for an extended period.

FIG. 3 provides a detailed view of a preferred roll profile that holds the feed material in the compaction zone for an extended period of time. The undulating exterior roll profile shown also produces a compacted product with a relatively uniform thickness, thereby insuring that the compaction forces are nearly equal across the width and length of the product. Referring to FIG. 3, a roll (31) having a specified outer diameter (32) and inner diameter (39) rotates about a point (33) to engage feed material. The roll is faced with a set of undulating shapes defined by valleys (34) with center points arrayed along a diameter (35), and ridges (36) with center points arrayed along a lesser diameter (37). Straight tangent segments (38) connect the ridge and valley arcs. This pattern repeats at a specified angle (40) around the full circumference of the roll to create a roll profile containing an assemblage of ridge and valley arcs that are connected by straight tangent segments arranged around the roll circumference at equal spacing. The radii of the valley arc segments are equal to, or less than, the radii of the ridge arc segments. The length of the tangent segments is specified to span the distance between the valley and ridge arc segments. The greater the length of the tangent segment, the greater will be the compaction forces exerted on the solid material compacted between the counter-rotating rolls. The greater the length of the tangent segment, the thinner will be the profile of the compacted material exiting the press rolls. Preferably, the length of the tangent segments spanning the distance between the valley and ridge arc segments is greater than or equal to 2 mm. More preferably, the length of the tangent segments is greater than or equal to 8 mm. Even more preferably, the length of the tangent segments is greater than or equal to 15 mm. The size of the assemblage is preferably such that an even number ridge/valley arc segments are spaced around the circumference of the roll. Preferably, the circumference of a roll contains at least 30 assemblages of ridge/valley arc segments, more preferably the circumference of a roll contains at least 36 assemblages of ridge/valley arc segments, and even more preferably, the circumference of a roll contains at least 40 assemblages of ridge/valley arc segments.

The tangent segments of these rolls exert high compaction forces onto the feed material in directions perpendicular to the angle of the tangent segments. This method of applying compaction forces minimizes slippage between the roll and material during compaction because frictional forces play only a minor part in propelling the material through the compaction zone, resulting in lower specific energy consumption and higher compaction forces. These energy and force profiles are in direct contrast to the energy consumption and compaction forces developed with the use of smooth rolls. In the case of smooth rolls, the feed material must be engaged by frictional forces developed between the material and smooth roll face to drag the material trough the compaction zone. This often results in slippage between the roll and feed material and compaction occurs during a relatively small angle of rotation due to the geometry of the two smooth rolls when they are in close proximity to one another. Similarly, rolls with a corrugated profile (i.e. rolls that do not have a straight tangent segment between ridges and valleys on the roll profile) are not effective because the compacted material varies in thickness due to the geometry of the rolls when they are in close proximity to one another.

Dried Product

The dried and compacted product produced by the processes of the invention is a solid carbonaceous fuel having a reduced moisture level and a higher bulk density than the low rank coal feed material initially introduced into the comminution and compaction processing steps. The product is typically formed as a ribbon or flaked solid carbonaceous material of high density and low water content. As described above, the ribbon or flaked product can be shaped by further compaction processes into briquettes or the like, as desired for shipment or slurry formation. A slurry of the product can be prepared by suspending or mixing the dried product, as either a ribbon or flake or shaped form, into water or other desired liquid, thereby rendering the product ideal for shipping, pumping or other transport or for feed directly to a gasifier.

The moisture level of the solid carbonaceous product or processed coal is less than about 25%. Preferably, the moisture level is less than about 20%, or more preferably less than about 18%, or more preferably less than about 16%, or more preferably less than about 14%, or more preferably less than about 10%, or more preferably less than about 7%.

The bulk density of the solid carbonaceous product is greater than about 500 Kg/m$^3$, or more preferably greater than about 550 Kg/m$^3$, or more preferably greater than about 600 Kg/m$^3$, or more preferably greater than about 650 Kg/m$^3$, or more preferably greater than about 700 Kg/m³, or more preferably greater than about 750 Kg/m³.

The invention now being generally described will be more readily understood by reference to the following examples, which are included merely for the purposes of illustration of certain aspects of the embodiments of the present invention. The examples are not intended to limit the invention, as one of skill in the art would recognize from the above teachings and the following examples that other techniques and methods can satisfy the claims and can be employed without departing from the scope of the claimed invention.

EXAMPLES

Example 1

One low rank coal (high-moisture lignite from North Dakota) was studied to assess the effects of preparing a high-solids concentration slurry. Results of these investigations are listed in Tables 1-3.

A sample of raw North Dakota lignite was crushed to pass 5 mm screen openings. The raw material, containing about 36 wt % moisture, was deslimed at 0.5 mm, treated with warm 35-g/l sulfuric acid for 1 hr, and compacted in a roll press set at 5 t/cm roll width closing force. The resulting ribbon of compacted coal was air dried at ambient conditions (about 24° C., 30% relative humidity) to a moisture level of about 20 wt %. The partially dried ribbon was compacted a second time, and air-dried to about 16 wt % moisture content. This process was repeated to achieve a moisture content of 14 wt %, 10 wt %, and 7 wt %.

The final compacted product was crushed by hand in a mortar and pestle to pass 12 mesh. The minus 12-mesh product was dry screened at various mesh sizes, the products were weighed, and the results are summarized in Table 1.

TABLE 1

Size Distribution of Crushed Compacted Ribbon

| Size Fraction (mesh) | Direct Wt % | Cumulative Wt % Retained |
|---|---|---|
| 12 × 20 | 16% | 16% |
| 20 × 30 | 24% | 40% |
| 30 × 50 | 30% | 69% |
| 50 × 100 | 17% | 86% |
| 100 × 0 | 14% | 100% |

Figure 4:
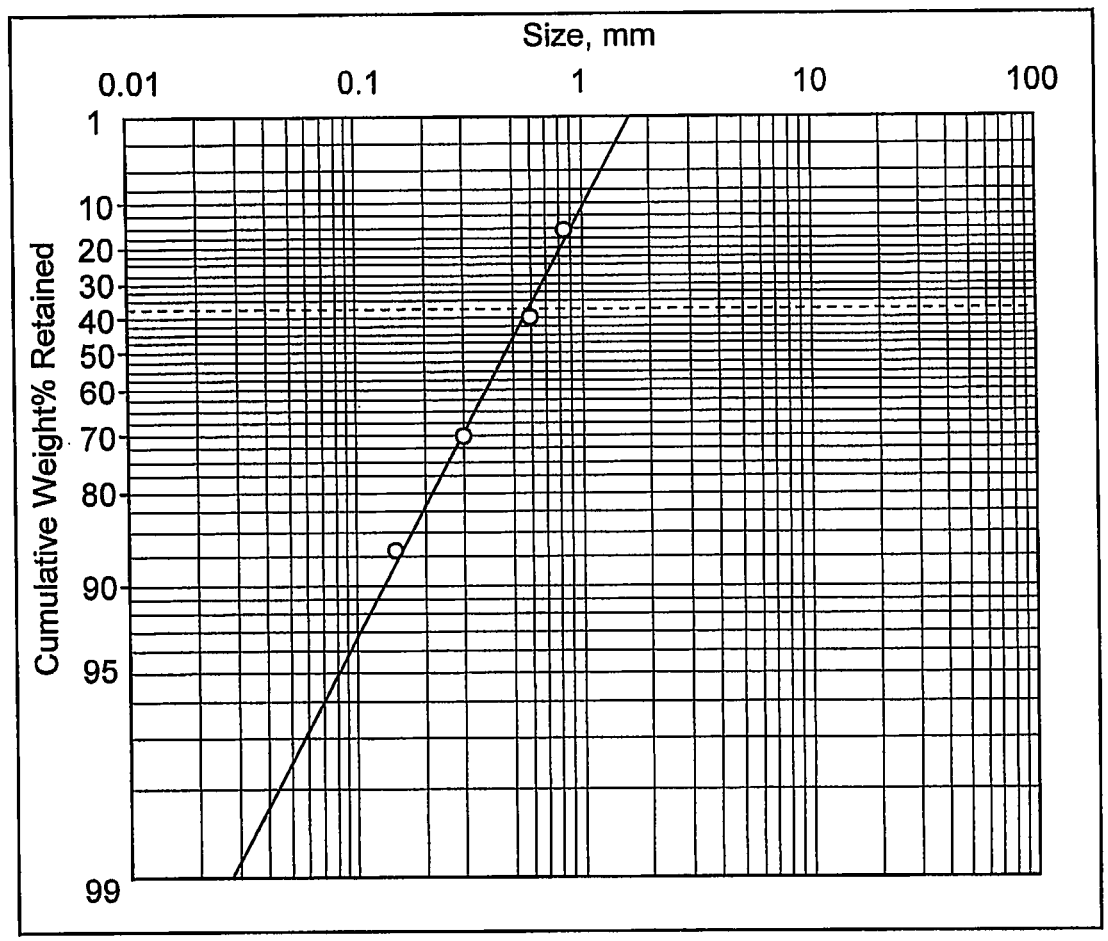
FIG. 4 is a Rosin-Rammler plot of a the size distribution of crushed compacted ribbon.

The data are plotted on a Rosin-Rammler graph shown in FIG. 4. The size fractions were measured for packed bulk density, and the results are listed in Table 2.

TABLE 2

Packed Bulk Density of Size Fractions

| Size Fraction (mesh) | Bulk Density, kg/m³ |
|---|---|
| 12 × 20 | 705 |
| 20 × 30 | 654 |
| 30 × 50 | 638 |
| 50 × 100 | 603 |
| 100 × 0 | 589 |

The various size fractions (12 m×20 m; 20 m×30 m; 30 m×50 m; 50 m×100 m; and 100 m×0) were blended together in various ratios to produce a mixture of a desired size distribution. For three experiments, mixtures (Compositions A, B and C) with a bi-modal size distribution were produced as described in Table 3. Size fractions combined in the proportions listed in Table 3 were chosen to maximize solids packing in a slurry.

TABLE 3

Composition of Three Mixtures of Crushed Compacted Ribbon

| Size Fraction (mesh) | Composition A Mixture (wt %) | Composition B Mixture (wt %) | Composition C Mixture (wt %) |
|---|---|---|---|
| 12 × 20 | 0% | 0% | 50% |
| 20 × 30 | 28% | 0% | 0% |
| 30 × 50 | 14% | 43% | 0% |
| 50 × 100 | 0% | 0% | 50% |
| 100 × 0 | 58% | 57% | 0% |

The solids compositions, each containing about 5 wt % moisture (inherent), were mixed with trace amounts of lignin sulfonate (a viscosity modifier) and distilled water to form a stable, pumpable slurry. The results are listed in Table 4.

TABLE 4

Slurry Characteristics Formed From Various Size Fractions

| Parameter | Composition A Slurry | Composition B Slurry | Composition C Slurry |
|---|---|---|---|
| Solids bulk Density, kg/m³ | 48.0 | 45.4 | 47.0 |
| Solids Concentration, wt % | 53 | 52 | 54 |
| Pulp Density, g/cm³ | 1.15 | 1.14 | 1.08 |
| Estimated HHV, KJ/kg | 14421 | 13956 | 14654 |

In this example, the slurry contained approximately the same heating value (kJ/Kg) as the original solid fuel (15119 KJ/kg) from which the slurry was formed.

Example 2

A sample of North Dakota Lignite was deslimed at 35 mesh to remove high-ash sand and clay, and immersed in 35 g/l concentration sulfuric acid for 1 hr at 37° C. The treated product was rinsed and mechanically dewatered. The dewatered product was compacted and dried by the methodology of the present invention.

Figure 5:
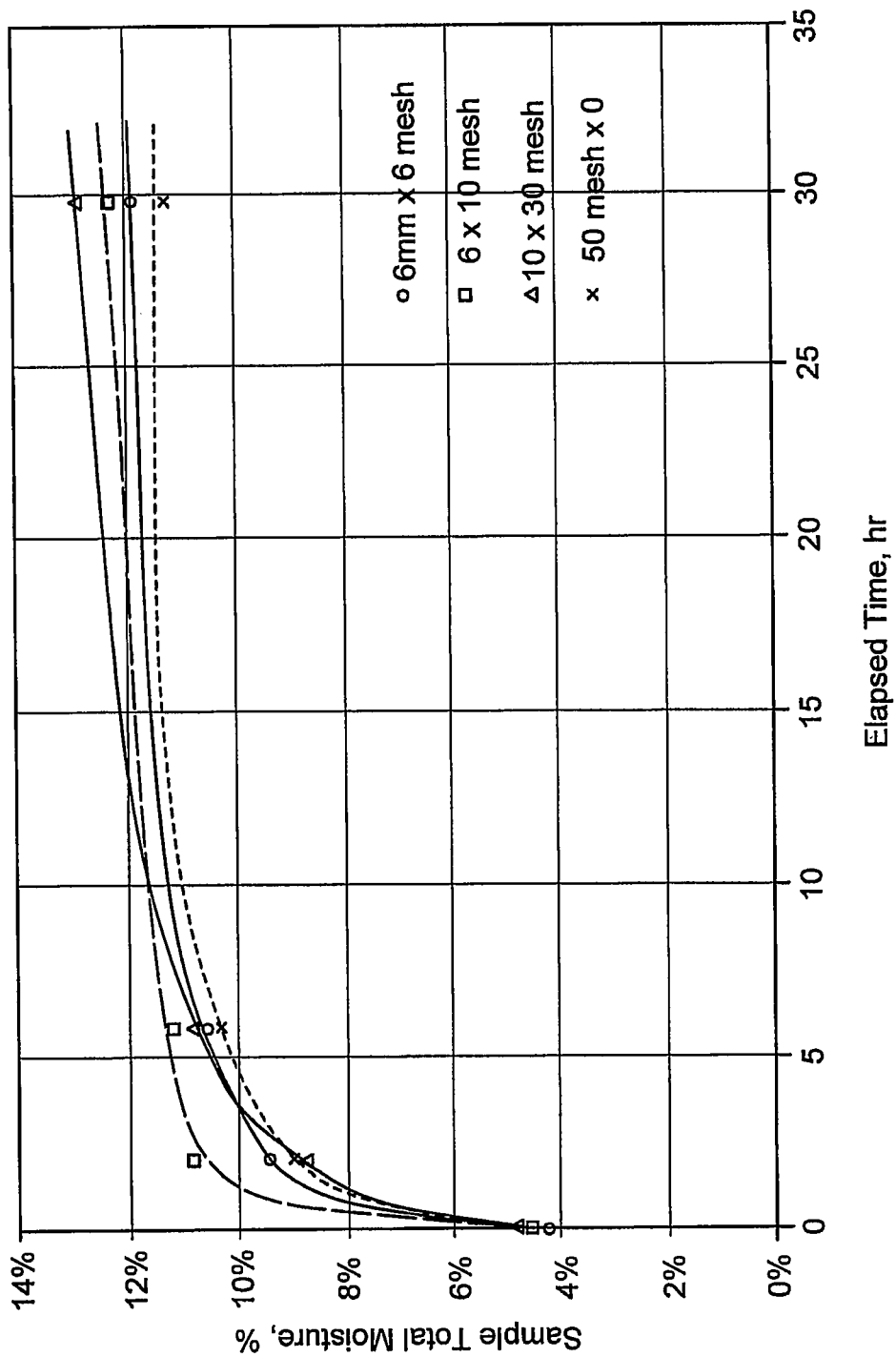
FIG. 5 shows water re-absorption rates for compacted North Dakota lignite particles by size fraction.

The compacted product was crushed and screened into size fractions. Each size fraction was assayed for total moisture content, and then immersed in distilled water held at ambient temperature (about 24° C.). The water absorption rate was measured at various time intervals. The total water contained in the immersed solids was computed by adding the water held in the sample at the start of the test with the water absorbed during immersion. The heating value of the immersed compacted material was calculated based on total moisture content and the moisture-ash-free calorific value of the material. The results are listed in Table 5, and the values for each size fraction are plotted in FIG. 5.

Commercial slurry operations maintain slurry in holding tanks between 4 and 8 hr. The estimated heating value of the slurry was obtained by assuming the following properties of the LRC material and slurry properties: 1) Exterior water content: 30% (minimum required to form pumpable slurry); 2) Interior water content: 12% (for 5-hr hold time); 3) Ash content: 5% (as-received basis); and, 4) Moisture-ash-free higher heating value: 28,842 kJ/Kg. The heating value of pumpable slurry produced by the present invention is about 16,515 kJ/Kg.

TABLE 5

Compacted North Dakota Lignite Test Data

| | Size Fraction ID | | | |
|---|---|---|---|---|
| | 2 | 3 | 4 | 6 |
| Elapsed time, hr | 6 mm × 6 mesh | 6 × 10 mesh | 10 × 30 mesh | 50 × 0 mesh |
| 0.0 | 4.25% | 4.53% | 4.85% | 4.77% |
| 2.0 | 9.42% | 10.86% | 8.77% | 8.98% |
| 5.8 | 10.60% | 11.19% | 10.90% | 10.28% |
| 29.8 | 11.92% | 12.33% | 12.94% | 11.29% |

Example 3

A sample of Indonesian lignite was compacted and dried as taught by the present invention. Acid treatment or desliming treatments were not required for this sample because of low ash content of this lignite feed material.

Figure 6:
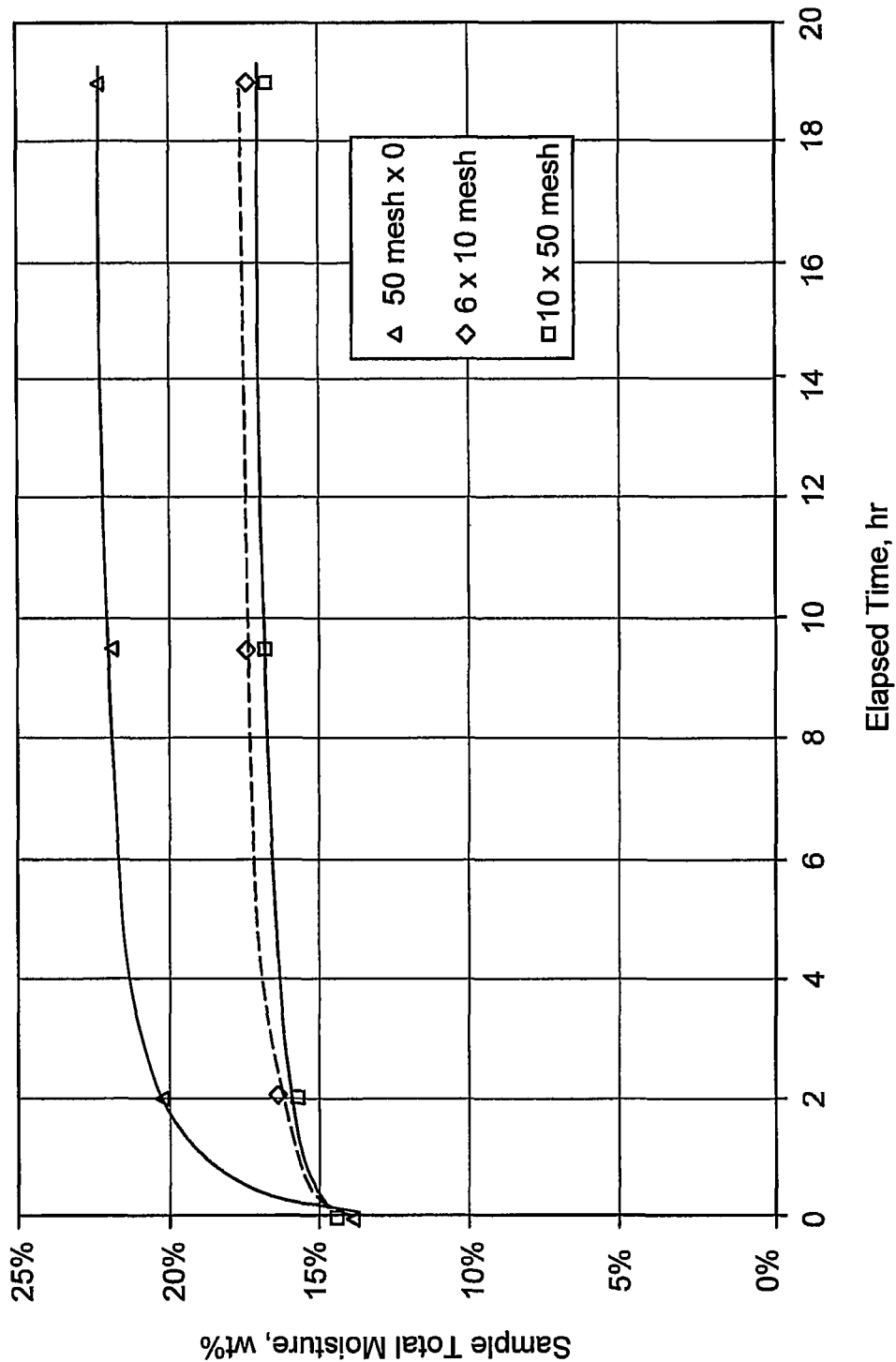
FIG. 6 shows water re-absorption rates for compacted Indonesian lignite particles by size fraction.

The compacted product was crushed and screened into size fractions. Each size fraction was assayed for total moisture content, and then immersed in distilled water held at ambient temperature (about 24° C.). The water absorption rate was measured at various time intervals. The total water contained in the immersed solids was computed by adding the water held in the sample at the start of the test with the water absorbed during immersion. The heating value of the immersed material was calculated based on total moisture content and the moisture-ash-free calorific value of the material. The results are listed in Table 6 and the values for each size fraction are plotted in FIG. 6.

Commercial slurry operations maintain slurry in holding tanks between 4 and 8 hr. The estimated heating value of the slurry was obtained by assuming the following properties of the LRC material and slurry properties: 1) Exterior water content: 30% (minimum required to form pumpable slurry); 2) Interior water content: 18% (for 5-hr hold time); 3) Ash content: 2% (as-received basis); and, 4) Moisture-ash-free higher heating value: 28145 kJ/Kg.

The heating value of pumpable slurry produced by the methodology of the present invention was about 15,584 kJ/Kg.

TABLE 6

Compacted Indonesian Lignite Test Data

| | Size Fraction ID | | |
|---|---|---|---|
| | 3 | 4 | 5 |
| Elapsed time, hr | 6 × 10 mesh | 10 × 50 mesh | 50 mesh × 0 |
| 0 | 14.36% | 14.39% | 13.87% |
| 2.0 | 16.37% | 15.73% | 20.36% |
| 9.5 | 17.49% | 16.87% | 22.01% |
| 19.0 | 17.41% | 16.87% | 22.36% |

Example 4

Experiments were conducted to measure compaction effectiveness, capacity, and specific energy consumption with rolls of various profiles. Commercial roll presses having rolls with conventional roll profiles were compared to rolls of the present invention with roll profiles described supra, in the present disclosure. The energy required to drive the rolls was measured over three power settings, and the results are listed in Table 7.

TABLE 7

Specific Energy Consumption for Compaction Rolls

| | Screw Specific Energy, kwh/st | | | Roll Specific Energy, kwh/st | | | Total Specific Energy, kwh/st | | |
|---|---|---|---|---|---|---|---|---|---|
| Power Setting | Present Invention | Smooth Roll | Difference | Present Invention | Smooth Roll | Difference | Present Invention | Smooth Roll | Difference |
| High | 24.84 | 34.40 | −9.56 | 13.10 | 8.76 | 4.34 | 37.94 | 43.16 | −5.22 |
| Medium | 14.65 | 26.77 | −12.12 | 14.88 | 11.08 | 3.81 | 29.54 | 37.85 | −8.31 |
| Low | 6.33 | 23.80 | −17.47 | 10.46 | 10.05 | 0.41 | 16.79 | 33.85 | −17.06 |

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of removing void spaces present in a carbonaceous material comprising:
    comminuting a carbonaceous material to form a crushed material;
    compacting the crushed material in a roll press comprising first and second counter-rotating rolls to form a compacted material,
    wherein the first and second counter-rotating rolls each comprise a circumferential profile of assemblages of ridge and valley arcs repeating at equal spacing around the circumference of the roll, and connected by straight tangent segments,
    and the first and second rolls of the roll press are rotated together in a timed ridge-to-valley process to compact the crushed feedstock between respective peaks and valleys of the first and second counter-rotating rolls to increase a residence time of the crushed material in the roll press when forming the compacted material; and, drying the compacted material to produce a solid carbonaceous fuel.

2. The method of claim 1, wherein particle top size of the crushed material is between 0.5 mm and 6 mm in the longest particle diameter.

3. The method of claim 1, further comprising removing clays or metallic ions from the crushed material prior to the compacting step.

4. The method of claim 3, wherein the removing step comprises contacting the crushed material with an acid to form an acidified product and desliming the acidified product.

5. The method of claim 1, wherein the crushed material is compacted at a pressure between 20,000 kPa and 300,000 kPa.

6. The method of claim 1, wherein the crushed material is compacted at a pressure between 100,000 kPa and 270,000 kPa.

7. The method of claim 1, wherein the crushed material is compacted to form a ribbon of compacted material.

8. The method of claim 1, wherein the crushed material is compacted to form flakes of compacted material.

9. The method of claim 1, wherein the drying comprises contacting the compacted material with air warmed to a temperature above ambient temperature.

10. The method of claim 1, wherein the drying is conducted in an indirect-fired rotary dryer.

11. The method of claim 1, wherein the drying is conducted until the solid carbonaceous fuel has a moisture level of less than about 25%.

12. The method of claim 1, wherein the compacting of the carbonaceous material reduces a pore volume of the compacted material.

13. The method of claim 1, wherein the first and second rolls each comprises between 30 and 40 assemblages of the ridge and valley arcs on the circumference profile of the first and second rolls.

14. The method of claim 1, wherein a distance between the ridge and valley arcs and the tangent segments spanning is greater than or equal to 2 mm.

15. The method of claim 1, wherein a length of the straight tangent segments is greater than or equal to 8 mm.

16. The method of claim 1, wherein a length of the straight tangent segments is greater than or equal to 15 mm.

17. The method of claim 1, wherein the circumferential profile of the first and second rolls contains at least 30 assemblages of the ridge and valley arcs.

* * * * *